Dec. 29, 1959 J. M. N. HANLET 2,919,377
INFORMATION STORES
Filed March 8, 1957
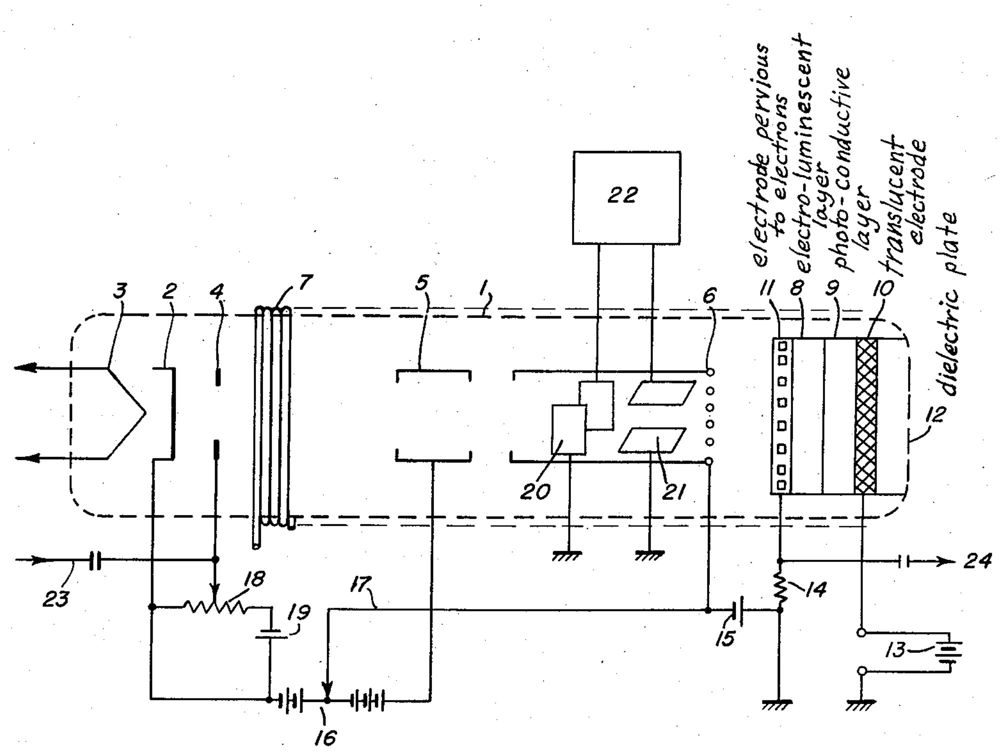
INVENTOR
Jacques M. N. Hanlet
BY Ralph B. Stewart
ATTORNEY

United States Patent Office 2,919,377

Patented Dec. 29, 1959

2,919,377

INFORMATION STORES

Jacques Marie Noël Hanlet, Paris, France, assignor to Societe d'Electronique et d'Automatisme, Courbevoie, France Application March 8, 1957, Serial No. 644,759

Claims priority, application France March 17, 1956

12 Claims. (Cl. 315—12)

The present invention relates to an improved information store of the kind wherein cathode ray means are used for recording and reading informations on and from an information retaining screen associated therewith, a record thereon being obtained from a scanning of the said screen with a cathode ray beam which is then modulated by an incoming information signal and a reading out being obtained from a further scanning of the said screen with a cathode ray beam which is not modulated by any signal but ensures a delivery of an electrical signal across an output load resistor connected to the said screen.

According to the invention, an improved information store of the herein above specified kind is mainly characterised in that it comprises a slow electron cathode ray tube having an information retaining screen which is made of at least one electroluminescent layer and one photoconductive layer between a pair of conducting electrodes one of which, facing the cathode ray generating means is made pervious to the said slow electrons therefrom, the said photoconductive layer being connected to an output load circuit and means being provided for applying a D.C. potential difference across the said conducting electrodes of the said screen. The operation of such a store may be summarized as follows:

For a recording operation therein, the cathode ray beam is generated and modulated by an incoming information signal. The D.C. potential difference is applied across the conducting electrodes of the said screen and the modulated slow electron cathode ray beam scans the surface of the said screen according to a predetermined raster therefor. The electroluminescent layer in the screen has its localized conditions changed upon being activated from the impact of the slow electrons in the scanning modulated beam, and the illumination thereof activates in turn the photoconductive layer, of which the internal resistance is modified in accordance with the light pattern of the said electroluminescent layer. Consequently the action of the D.C. voltage difference across the electrodes of the screen will selectively maintain the illumination of the electroluminescent layer therein in the very pattern of the record as long as the said voltage difference is applied thereacross.

During the time interval of such a recording period, an output signal is of course obtained across the load connected to the said photoconductive layer although not required. Of course, a gate may be inserted between the said photoconductive layer and the said output load so that an output may be inhibited therefrom when desired.

For a reading operation, following such a recording operation as explained, a further scanning process is applied to the said cathode ray beam but, in such a case, no modulation is impressed thereon. Obviously, during this scan, the activation of the pattern displaying electroluminescent layer in the screen is varied and consequently the activation of the said photoconductive layer therein. An output "video" signal is thus obtained across the output load connected thereto, which will normally not be inhibited as being the useful signal from the store. Partial inhibition during the time interval of a reading operation may be provided when only part of the information is required therefrom. Further, the scanning rasters may be different from a recording operation to a reading operation if and when required, whereby such an information store may be easily used as a coordinate converter.

Cancellation of the D.C. potential difference across the conducting electrodes of the screen will ensure an erasing of the contents thereof.

The attached drawing shows an example of arrangement of an information store according to the invention, in a merely illustrative way as numerous minor changes may be made therein without departing from the spirit and scope of the said invention as defined by the claims appended hereto.

In the disclosed arrangement, a cylindrical vacuum vessel includes:

An electron gun comprising a cathode 2, a heater 3 therefor and a control grid or electrode 4, An accelerating anode 5 followed by a decelerating and electrostatic focussing grid 6, for controlling the speed of the electron beam from the said electron gun, And a screen structure comprising a conducting electrode 11 which is pervious to the slow electrons of the beam, over an electroluminescent layer 8, preferably of a monocrystalline composition, over which is provided a photoconductive layer 9 coated with a further conducting electrode 10 which is preferably translucent. Such a screen is borne by a dielectric plate 12 of translucent material which preferably constitutes the end wall of the vessel at this end thereof, being appropriately sealed to the cylindrical wall thereof.

It is obvious that, when the heater 3 is fed with a heating current, the cathode 2 emits electrons which are accelerated by the anode 5. The intensity of the beam depends upon the voltage applied to the control grid 4. An electromagnetic focussing is impressed to the beam for instance from a coil 7 which must be understood as extending across the whole span of the cylindrical wall of the vessel. An electronic image of the first anode opening is then focussed in the plane of the decelerating grid 6. The said grid 6 is provided with a high fineness and a high transparency to the electrons of the beam. It provides the high definition required for the operation of the store. As shown, the grid 6 is brought to a potential lower than that of the accelerating anode 5, it being connected by conductor 17 to an intermediate tap on the battery supply 16 for the said accelerating grid 5. The grid 6 actually plays the part of a convergent lens which does not disturb the focussing of the beam of electrons which is projected beyond the said grid 6 with a quite reduced speed, the electrons having been decelerated by the speed slowing field between the grids 5 and 6.

The cathode 2 is shown connected to the negative pole of the said battery 16, as usual and the control grid 4 is biased from a battery element 19 to a voltage which is slightly lower to that of the cathode, through an adjusting potentiometer 18. When for instance the cathode is brought to 0 volts, the control grid is biased up to a value not exceeding −20 volts, the anode 5 is biased to +300 volts and the anode 6, to +250 volts.

The decelerating electrode 6 is provided quite close to the conducting electrode 11 of the screen, which receives a biasing voltage neighbouring the voltage applied to the said grid 6. For instance, when the grid 6 is brought to +250 volts, the electrode 11 is brought to +260 volts.

The screen in this arrangement may be made as follows: The supporting plate 12 is made of high purity silica, a translucent material as known, and both faces thereof are polished to the so-called "optical" polish. Consequently the contents of the store will be displayed therefrom. Further, silica has a very high melting point which is useful in the preparation of the screen.

Over one face thereof a film of a complex of metallic oxides is formed, said complex being of low electrical resistance and of high transparency to the light. Such a film may be obtained from a pyrolitic conversion of a mixture of vapours of niobium pentabromide and thorium pentabromide on the said silica support within an atmosphere of pure oxygen. The said vapours will be driven by a flow of oxygen into a vessel wherein the said silica disc 12 is heated, from a high frequency induction process, up to 600° C. or a neighbouring temperature thereto. The niobium and thorium oxides are deposited upon the exposed face of the disc and the bromine is evacuated from the excess of oxygen flow. The film of oxides which results from such an operation presents a resistance value of the order of 10 ohms per square centimeter and a transparency higher than 85% to a light wavelength of 5,000 A. The melting temperature of such an oxide film is quite high, the melting point of niobium being higher than 1500° C. In the shown arrangement, this film constitutes the conducting electrode 10 in the screen.

A pure silicon film is established over the said oxide film, as shown at 9 on the drawing. To this end, the silica disc may be placed within a vessel wherein a dry hydrogen flow is established and in this flow are introduced fumes of silicon tetrachloride. The silica disc is heated for instance by applying an electrical current through the oxide film thereon, up to a temperature of about 1200° C. The silicon tetrachloride is reduced by hydrogen and simultaneously dissociates so that silicon will be deposited over the said oxide film. The thickness of the silicon film may be of the order of 100 microns at the upmost.

The electroluminescent layer 8 will be formed over the silicon film 9 and, for instance, the electroluminescent material will be made of a combination of zinc and copper oxides, in a monocrystalline pellicular structure of only some molecules of thickness. To such an end, the silica disc bearing the above defined conducting and photoconducting films will be placed within a vessel facing a plate upon which has been previously formed a homogeneous alloy of zinc and copper with a suitable ratio between zinc and copper such as, for instance .8% of copper, the balance of zinc. An atmosphere of oxygen under a low pressure is established within the vessel and a D.C. potential difference is applied between the above two elements so that an ionic discharge is obtained therebetween with an ionic current density of the order of 70 to 100 milliamperes per square decimetre of the facing surfaces of alloy and silicon. The alloy layer constitutes the cathode of this discharge arrangement and the oxygen atmosphere ensures the projection of ions onto the surface of the said cathode. Particles are extracted therefrom, oxidised and driven onto the silicon, due to the electrostatic field therebetween. A high frequency heating is simultaneously applied to the silica disc so that during the formation of the zinc and copper oxide layer, a crystallisation thereof is concomitantly ensured. It is obvious that such a process results in the formation of a monocrystal of a complex of zinc and copper oxide onto the silicon film.

The operation is stopped when the required thickness is met, which is apparent from an optical observation of the surface of the crystal during the formation thereof. After cooling, the vessel will be evacuated and copper will be evaporated over the surface of the electroluminescent material, into a film which will constitute the conducting electrode 11 which is pervious to electrons. Another metal than copper may be used but copper appears to be preferred as it presents a quite low reflectivity of the light emitted from an electroluminescent material comprising zinc and copper oxides as herein above defined. Consequently no loss of definition of the light spots in the screen will occur from reflections of the pervious electrode in such a scheme.

Once the screen structure made as described and the silica disc sealed to the cylindrical wall of the tube, the structure is completed.

Whereas, for the sake of simplicity of the explanation, it has been said in the introduction that the output load were connected to the photoconducting layer, it is apparent that said output load may be, as required, connected to any one of the three elements: photoconductive layer, first conducting electrode and second conducting electrode, as the changes of potential will be the same in these three elements. In the example shown in the drawing, the output load resistor 14 is connected between the electrode 11 and the ground. The D.C. voltage for preservation of the contents of the store will be supplied from battery 13 connected between the electrode 10 and the ground.

Two pairs of deflecting plates are shown at 20 and 21 and these deflecting plates will be supplied from a conventional saw-toothed voltage generator 22.

The information signal will arrive from the input 23 to the control grid 4. The output signal will be obtained across the resistor 14, from an output connection 24.

Considering that the scanning voltage generator 22 is activated during the time interval of a single scan, during which also an incoming "video" signal is applied to 23, a modulated cathode ray beam will scan the screen of the store, wherein a pattern will appear in the electroluminescent layer 8, corresponding to the development of the said signal over the surface of the screen. The application of the D.C. potential to the screen will ensure the preservation of the said record. A reading of the stored information may then be obtained from scanning anew the surface of the screen with a nonmodulated beam. In such a case, the control grid 4 will receive a constant voltage of such a value that the beam in the said scan will reinforce the brightness of all points in the screen which have been previously illuminated from the recording operation, but without activating the electroluminescence of the layer 8 at points other than the above mentioned points. In the above-defined conditions, for instance, this will be obtained when across the grid 6 and the electrode 11 the potential difference will be of the order of 1.5 volts. The output signal across resistor 14, of a value of 5 kilomhs, will then be positive and of an amplitude of 2 millivolts when the information is of the binary coded kind. The signal to noise ratio in the output signal will be of the order of 40 db.

The scanning raster may be made different from recording to reading, as said. Either the waveforms issuing from the scanning generator 22 will be different or else a different scanning generator and different set of scanning electrodes will be provided (for instance, the recording may be made according to a cartesian coordinates raster and the reading out according to a polar coordinate raster).

For recording, a potential difference of the order of 3 volts may for instance be established between the grid 6 and the electrode 11 by battery 15. With the above defined voltages, the energy of the electrons falling onto the said electrode 11 will be quite low, of the order of 2 to 2.5 electron-volts, neighbouring the blue-green radiation from the zinc oxide. In such a band of frequencies, the brightness of the activated spots will fall after about .5 microsecond to one-third of the original value. However, the use of an electroluminescent material based upon zinc oxide is interesting as it is activable under quite small energies falling thereon.

Without any light, the resistance of the silicon film is very high, slightly above 600,000 ohms per centimeter at ambient temperature. Under a potential difference of 2 volts, and a light brightness of 1 lumen, the silicon delivers a current of about 100 microamperes. But on the other hand, the time of response of silicon and the remanency after cancellation of the activation effect are very advantageous as being very small. Each light spot activated within the monocrystalline layer entails a localized change of internal resistance of the silicon layer and at such a place the silicon will let the electroluminescent material receive from the battery 13 a voltage of sufficient value for maintaining the said activation (and also, of course, to produce a current through the output resistor load 14). When the light spot is of the order of 4 hundredths of one millimetre in diameter, the voltage across the photocell is equal to about 200 millivolts per activated spot. The voltage difference applied to the illuminated spots of the electroluminescent layer through the said photoconductive layer will avoid any loss of brightness of the said spots, thus opposing to the above-mentioned deterioration effect. Consequently a record will be sustained as long as the voltage from the battery 13 is applied to the said screen and several readings may be made before cancelling the said information display, as a reading operation is non-destructive per se of the stored information as apparent from the above. However as soon as the said battery voltage is suppressed, the information contents are erased in about one-half of a microsecond. It is then quite apparent that such an information store may be operated at very high speeds if required and it is apparent further, specially from the dimensions of the light spots corresponding to information bits therein that such a store will also be of reduced volume or size with respect to the capacity of informations which may be stored and processed therein.

What is claimed is:

1. An information store comprising a slow electron cathode ray tube having an information recording screen which comprises a pair of conductive electrodes one of which is pervious to the said slow electrons, at least one electroluminescent layer facing the cathode ray beam and one photoconductive layer applied therebehind, both layers located between the electrode means for scanning the said screen according to at least one predetermined raster, and means for controlling the scanning beam during such scanning operations, means through which a D.C. potential difference may be applied across the said pair of conductive electrodes and means connected to the screen through which may be obtained an electrical signal representative of the contents of information of part at least of the said store.

2. An information store according to claim 1 and wherein each component element in the said screen is constituted by a film, the said films being superposed one over the other and over an end dielectric and translucent disc forming part of the end wall of the vessel of the said cathode ray tube.

3. An information store according to claim 2 and wherein the conducting electrode applied to the said disc comprises a film of resistive oxides, the said disc being a disc of pure silica.

4. An information store according to claim 2 and wherein the said photoconductive film comprises a film of pure silicon.

5. An information store according to claim 2 and wherein the said electroluminescent layer comprises a monocrystalline film of a compound including at least one activating and one activated oxide of different metals, and wherein the electrode thereon is constituted by an evaporated film of a metal which is nonreflective of the light from the said electroluminescent layer.

6. An information store according to claim 5 and wherein the said electroluminescent layer comprises zinc and copper oxides and the said electrode film thereon is made of copper.

7. An information store according to claim 3 and wherein the said film of oxides comprises a composition of niobium and thorium oxides.

8. An information store according to claim 1 and wherein the output lead from the store comprises a load resistance connected to one of the conductive layers in the said screen.

9. An information store according to claim 1 and wherein the electron gun of the said cathode ray tube comprises a control electrode for the alternative application thereto either of an information signal during any recording period thereof or a constant value potential during any reading out period thereof.

10. An information store according to claim 1 and wherein the said scanning means comprises means for scanning the said screen with the same raster during both a recording and reading out periods of operation thereof.

11. An information store according to claim 1 and wherein the said scanning means comprises means for scanning the said screen according to a first raster during a period of recording therein and according to a different raster during a period of reading-out therefrom.

12. An information store according to claim 1 and wherein the said D.C. voltage difference applying means to the said screen comprises means for cancelling the activation of the screen before a recording period of operation thereof.

References Cited in the file of this patent

UNITED STATES PATENTS

| | | |
|---|---|---|
| Re. 23,802 | Sheldon | Mar. 16, 1951 |
| 2,780,765 | Chapin et al. | Feb. 5, 1957 |
| 2,805,360 | McNaney | Sept. 3, 1957 |

FOREIGN PATENTS

| | | |
|---|---|---|
| 157,101 | Australia | June 16, 1954 |

OTHER REFERENCES

Leverenz: "Luminescence of Solids," John Wiley and Sons, Inc., New York, 1950, page 74.

Pensak: "Conductivity Induced by Electron Bombardment in Thin Insulating Films," Physical Review, vol. 75, No. 3, January-March, 1949.

UNITED STATES PATENT OFFICE

CERTIFICATE OF CORRECTION

Patent No. 2,919,377 December 29, 1959

Jacques Marie Noël Hanlet

It is hereby certified that error appears in the printed specification of the above numbered patent requiring correction and that the said Letters Patent should read as corrected below.

Column 5, line 42, for "electrode" read -- electrodes, --; column 6, line 31, strike out "a".

Signed and sealed this 13th day of December 1960.

(SEAL)

Attest:

KARL H. AXLINE
Attesting Officer

ROBERT C. WATSON
Commissioner of Patents